Dec. 28, 1954   G. WIKKENHAUSER   2,698,428
REMOTE REPEATER OR INDICATING APPARATUS
Filed June 8, 1951   3 Sheets-Sheet 3

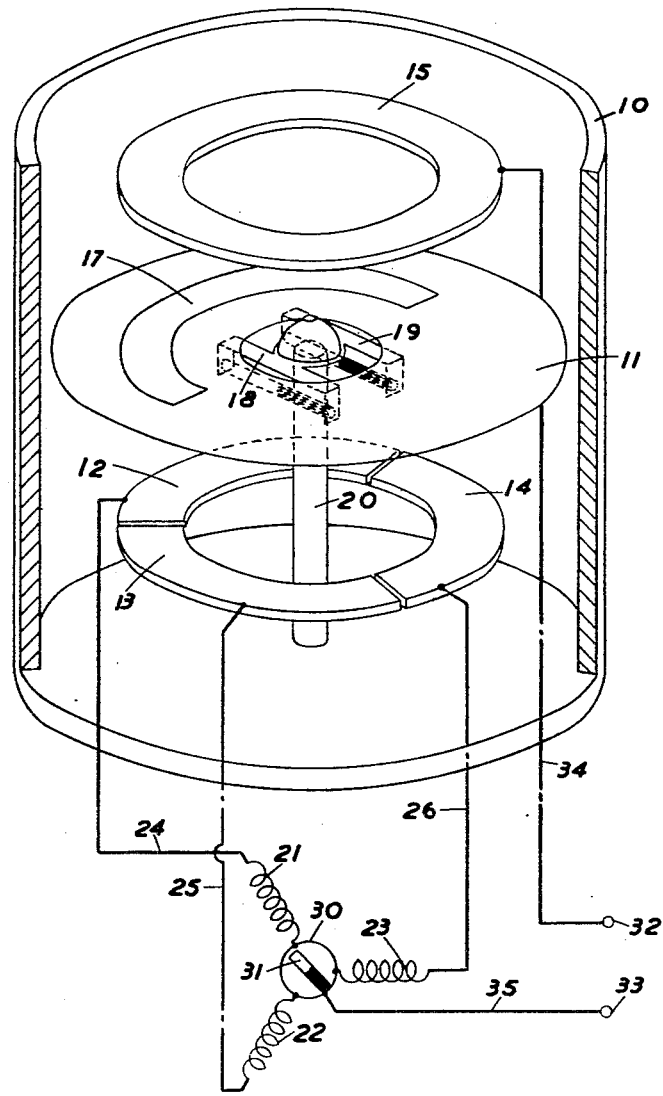

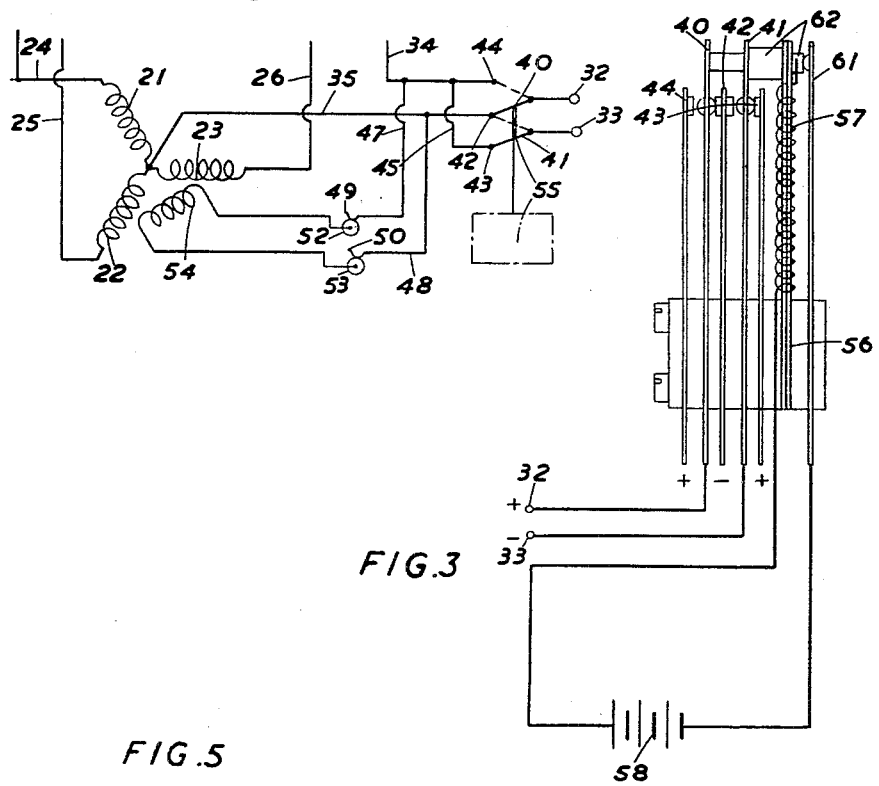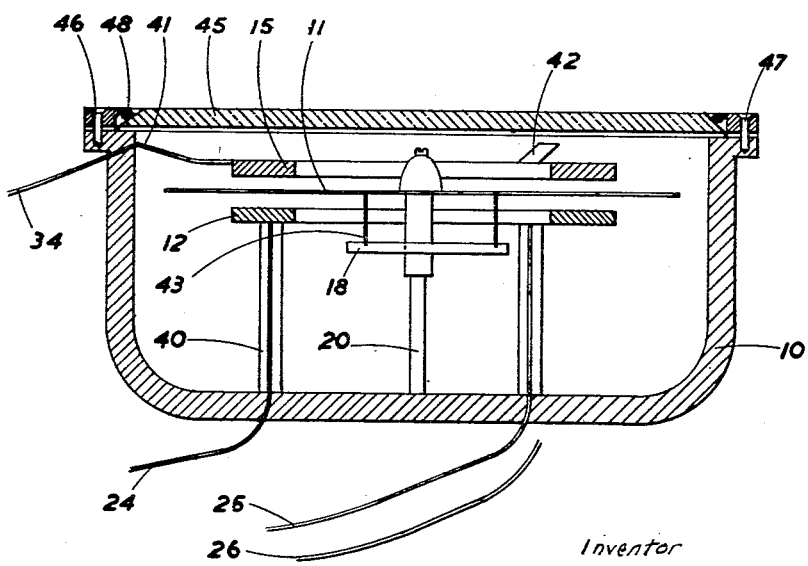

Inventor
GUSTAV WIKKENHAUSER
By Moore and Hall
Attorneys

United States Patent Office 2,698,428
Patented Dec. 28, 1954

2,698,428

REMOTE REPEATER OR INDICATING APPARATUS

Gustav Wikkenhauser, Hillington, Glasgow, Scotland, assignor to Kelvin & Hughes Limited, Glasgow, Scotland Application June 8, 1951, Serial No. 230,663

Claims priority, application Great Britain June 16, 1950

6 Claims. (Cl. 340—177)

This invention relates to remote indicating apparatus.

The main object of the invention is to provide an apparatus in which a transmitter or master device does not impose any load on the instrument whose movement is to be repeated at a distance.

Another object of the invention is to provide such an apparatus of simple construction preferably without any amplification, thermionic or otherwise. A further object of the invention is to provide such an apparatus which can be operated from a direct current source of comparatively low voltage.

According to the invention the transmitter comprises a rotatable apertured disc located in an electrically conductive liquid with a stationary segmented electrode element on one side and a stationary non-segmented electrode element on the other side both said elements being in the liquid. The elements may be connected by electric conductors to a remote indicating device and to a source of electric current whereby the position of the apertured disc determines the current distribution between the segmented element and the non-segmented element thereby controlling the remote indicating device.

The invention will now be further described by way netic compass where the magnetic directive force is comparatively low, and where the magnetic sensing element will have to be placed at some distance from the indicating instrument to ensure freedom from the disturbing influences which might be present near the indicating instrument.

Such conditions will generally prevail in aircraft applications and in small aircraft the only electric power available is direct current of comparatively low voltage.

The invetnion will now be further described by way of example with reference to the accompanying diagrammatic drawings wherein:

Figure 1 shows a tele-indicating magnetic compass made in accordance with the invention, partly in perspective and partly as an electric circuit diagram;

Figure 2 is a circuit diagram being a modified form of the lower part of Figure 1;

Figure 3 is a view partly in side elevation and partly in circuit diagram of a polarity changing device for use in the apparatus shown in Figure 2 or 4;

Figure 5 is a sectional view of a modified form of the upper part of the apparatus shown in Figure 1.

Figure 4:
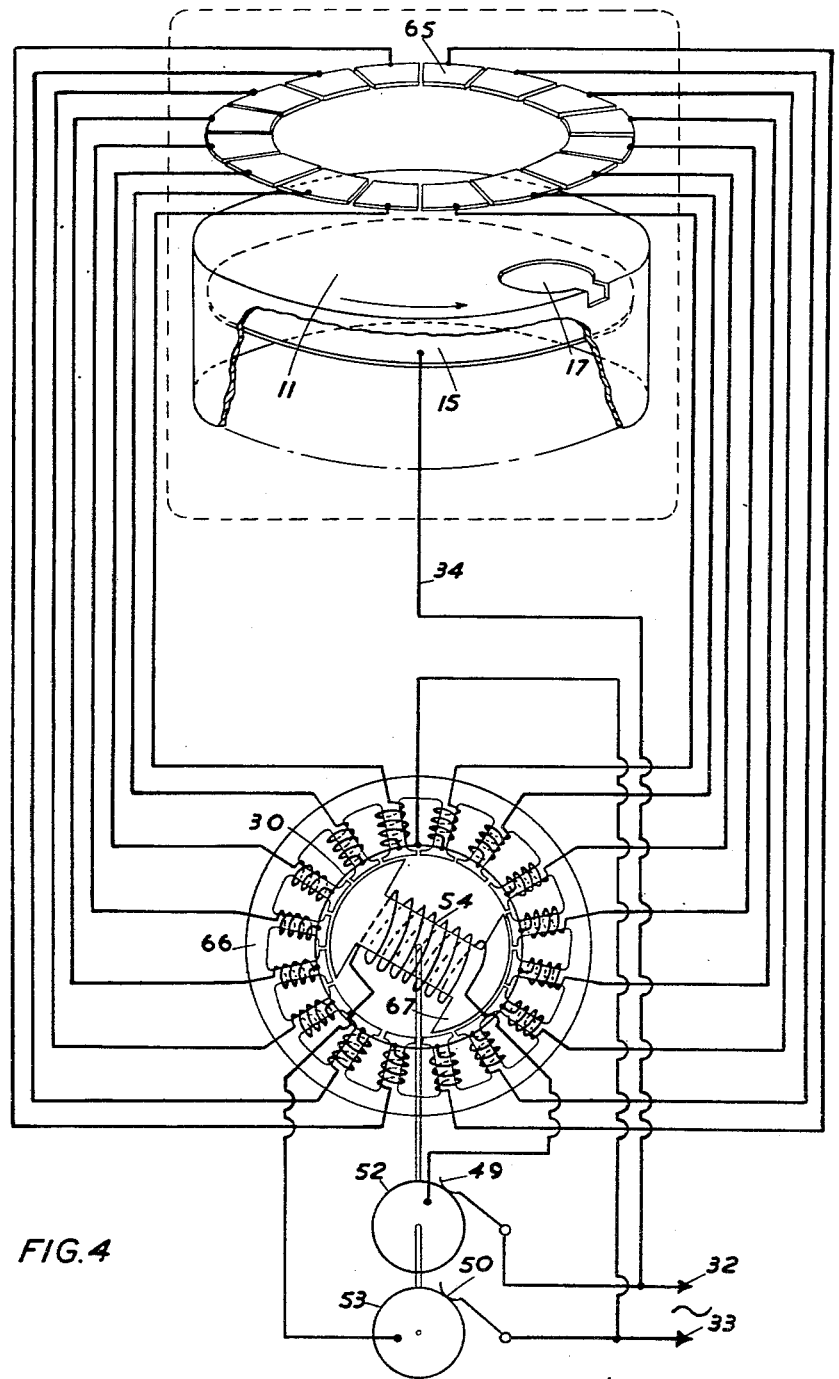
Figure 4 is a view similar to Figure 1 but showing a modified construction.

Referring first to Figure 1, a compass bowl 10 is filled with a conductive liquid. Within the bowl are the rotatable apertured disc 11, the stationary segmented electrode element having three segments 12, 13, 14, and the stationary non-segmented element 15.

The element 15 is a full circular disc and the segments 12, 13, 14, each extend over about 120° of an arc.

The elements 15 and 12, 13, 14, are disposed on either side of the disc 11 which is made of an electrically non-conductive material. The disc has an aperture 17 extending substantially over an arc of 180°. The disc is attached to magnetic compass elements 18, 19, which are carried rotatably by a jewel mounting on an erecting stem 20.

A remote indicating device comprises a 3 pole stator having three windings 21, 22, 23, connected by electric conductor cables 24, 25, 26 respectively to the segments 12, 13, 14. The windings are connected to a common conductor ring 30. Within the stator is a rotor comprising a magnet 31 rotatably mounted. A source of D. C. current supply 32, 33, is connected by cables 34, 35 to the element 15 and ring 30 respectively.

The electrical potential difference is applied to the element 15 on one side of the disc 11 and through the windings to the segments on the other side, and an electrical current flows between the element 15 and the segments. According to the position of the aperture 17 in the insulating disc 11, the current reaching the individual segments will be varied. As the apertured insulating disc 11 rotates, the current distribution in the individual segments will vary according to the position of the aperture in the disc relative to the segments.

As the current density is distributed un-uniformly between the segment electrodes, so will the current intensity vary in the three magnetic poles of the stator; in fact the three magnetic poles set up a magnetic force in the stator, the direction of which is lined up in the direction indicated by the position of the insulating disc 11 in the transmitter element. The rotor lines itself up in the same direction as the magnetic force.

The invention is not limited to the use of direct current only; in some applications it is preferable to use alternating current of a reasonably high frequency, say 400 cycles per minute, on the other hand in other cases it is convenient to change over the polarity of the D. C. source at short time intervals of, say, once every second. When alternating current (including changed D. C. polarity) is used to operate the system the 2 pole rotating magnet in the repeater is also energised from the same source of alternating current; consequently, the relative phase relation between the energised magnetic stator pole and the rotor is always preserved and remains the same as when used on direct current. If current is used to magnetise the rotor, slip-rings are provided on the rotor to feed in the energising current.

Figure 2 shows a circuit diagram of means for supplying polarity changing current. The D. C. supply 32, 33, is connected to switch elements 40, 41, which can move from contacts 42, 43, to the contacts 42, 44. The contacts 44, 42, 43, are connected respectively to the cable 34, cable 35, and through conductor 45 to cable 34. Cables 34, 35, are connected by conductors 47, 48, to brushes 49, 50, supplying current through slip rings 52, 53, to a magnetising winding 54 on the rotor. A polarity changing device 55 changes the polarity at a rate of about sixty per second.

A suitable polarity changing means is shown in Figure 3 and comprises a bi-metallic element 56 wound with a heating element 57 one end of which is connected to one end of a battery 58. The other end of the element 57 is connected to switch blades 40, 41, which are connected by brass bushes 62. The other pole of the battery is connected to a blade 61 forming a make and break device with the bushes 62 for making and breaking the current through the heating coil 57.

A minimum of three segments are required at the transmitter and three magnetic poles at the receiver. For certain applications and under certain conditions it might be preferable to use more than three poles at the transmitter and at the receiver. In an experimental construction illustrated in Figure 4 16 poles were used at the transmitter and the receiver. However, the aperture in the insulating disc is always a single aperture defining the direction into which the disc is pointing. But it might not be always the optimum arrangement to extend the aperture in the insulating disc over an arc of 180°.

In the apparatus shown in Figure 4, a segmented element 65 is connected to windings on a stator 66. The winding 54 is carried by a rotor 67. A. C. current is applied to the input terminals 32, 33.

There are some constructional considerations which should be fulfilled to ensure the efficiency of the instrument. It is important to have as great a difference as possible between the current values if the aperture of the insulated disc is in alignment with a particular segment in, or opposite to, this position; in other words, the useful signal current giving the alignment force will have to be as great as possible in relation to the overall leakage current. This means that a long leakage path will have to be provided although it is important that the disc electrode should be as close as possible to the segmented electrodes. It is essential that the insulating disc between the electrodes should be able to turn freely without touching either of them. It is also essential to choose a suitable conductive liquid which will be able to pass enough current at the source voltage available; also it is essential to avoid the formation and collection of gas bubbles on the electrodes. Furthermore, it is essential to use a liquid which does not decompose excessively, due to the current passing therethrough, and to choose suitable electrodes which will not be affected by the liquid generally.

In the experimental construction shown in Figure 4, the 16 segments were made of rhodium plated brass. A differential current in the ratio of 15 to 1 was achieved that is to say, the directing signal current was 15 times as much as the leakage current, and an angular position of 2° of an arc could be easily resolved on a measuring instrument. The liquid or electrolyte used in the experimental device was lithium chloride dissolved in a weak concentration in alcohol.

In the experimental device signal current approximately 10 m/A was passed through using a 24 v. D. C. source and the aperture in the insulating disc was such that approximately 3 segments were acting simultaneously giving a total signal current of something like 30 m/A.

Figure 5 shows a constructional form of the invention having a moulded plastic bowl 10 in which are sealed metallic supports 40 carrying the segments 12, 13, 14. The bowl also carries radial metal arms 41, 42 carrying the element 15 which is a mica compass card. The permanent compass magnet 18 is attached by arms 43 to the compass card. A glass cover 45 is fixed over the bowl by a metal ring 46 and screws 47 with a packing ring 48 interposed.

Although the invention is primarily intended to provide a very simple light weight tele-indicating compass for aircraft without amplifiers by attaching permanent magnet rods to the insulating disc, it is not limited to compass applications only, but could be usefully applied for all tele-indications where it is essential not to impose load on the prime mover. It is also not limited to aircraft compasses only, but could be used as a ship compass as well.

I claim:

1. A remote indicating device comprising a first stationary electrode having three distinct arcuate segments spaced substantially 120 degrees from one another, a second stationary non-segmented electrode substantially parallel to said first electrode, a rotatable disc pivotally mounted intermediate said first and second electrodes and substantially parallel thereto, said disc defining an aperture extending over an arc of substantially 180 degrees, each of said first and second electrodes and said rotatable disc being immersed in a liquid of relatively high electrical conductivity.

2. The apparatus of claim 1 including a source of electromotive force coupled between said non-segmented electrode and flux producing means, said flux producing means including three magnetic poles coupled respectively to each of said three arcuate segments, and indicating means within the flux fields of each of said poles and directionally responsive to the resultant flux field produced thereby.

3. The apparatus of claim 2 in which said liquid is lithium chloride dissolved in a weak concentration in alcohol.

4. A remote indicating device comprising a first ring-shaped stationary electrode having a plurality of congruent arcuate segments spaced from one another, a second non-segmented stationary electrode substantially parallel to said first electrode, a rotatable non-conductive disc mounted intermediate said first and second electrodes, said disc defining an aperture extending over an arc greater then that of any one of said segments, a bath of electrically conductive liquid defining paths of electrical continuity between said first and second electrodes through said aperture, and indicator means including a plurality of flux producing poles coupled respectively to each of said arcuate segments and also including rotor means directionally responsive to the resultant flux produced by said poles.

5. A remote indicating apparatus comprising a container having an electrically conductive liquid of relatively high conductivity therein, a first stationary electrode element, having a plurality of distinct, arcuate, congruent segments, immersed in said liquid, a second stationary non-segmented electrode element immersed in said liquid and substantially parallel to said first electrode element, a control disc rotatably mounted within said liquid intermediate said first and second electrode elements and substantially parallel to each of them, said control disc defining an aperture therein having a greater area than that of an individual segment of said segmented electrode; whereby the angular position of said control disc determines current distribution through said conductive liquid and between the segmented an non-segmented electrode elements, an indicating device including a plurality of stator windings electrically coupled to each of said stationary electrodes and to a source of D. C. current, and polarity changing means also coupled to said source of D. C., said polarity changing means comprising a bi-metallic element actuated by an electric current and operating polarity changing switching means.

6. The apparatus of claim 5 in which said electrode segments are of rhodium plated brass, said conductive liquid comprising lithium chloride dissolved in a weak concentration in alcohol.

References Cited in the file of this patent

UNITED STATES PATENTS

| Number | Name | Date |
| --- | --- | --- |
| 2,466,763 | Davis | Apr. 12, 1949 |
| 2,484,194 | Steinhoff | Oct. 11, 1949 |
| 2,527,771 | Smyth-Davila | Oct. 31, 1950 |

FOREIGN PATENTS

| Number | Country | Date |
| --- | --- | --- |
| 228,166 | Great Britain | Apr. 20, 1926 |